United States Patent [19]
Werner

[11] Patent Number: 6,109,848
[45] Date of Patent: Aug. 29, 2000

[54] PLASTIC NUT WITH MOLDED WASHER

[75] Inventor: Wolfgang Werner, Reutlingen, Germany

[73] Assignee: Emhart Inc., Newark, Del.

[21] Appl. No.: 09/328,557

[22] Filed: Jun. 9, 1999

[51] Int. Cl.[7] .............................. F16B 31/00; F16B 37/08
[52] U.S. Cl. ............................... 411/5; 411/369; 411/432
[58] Field of Search .................................. 411/3, 5, 368, 411/369, 432, 533

[56] References Cited

U.S. PATENT DOCUMENTS 3,004,776 10/1961 Sebardt ..................................... 411/5 X
4,887,948 12/1989 Calmettes ..................................... 411/5
4,979,857 12/1990 Wing ............................................. 411/5

Primary Examiner—Neill Wilson
Attorney, Agent, or Firm—Edward D. Murphy

[57] ABSTRACT

The invention relates to a plastic fastening element for fitting onto a stud with a base body (1) having a socket (2) with at least one orifice (3) for the stud, with a collar (4) which at least partially surrounds the orifice (3) and is formed integrally with the base body (1), with a perforated disc (5) which has a hole (6) orientated substantially coaxially to the orifice (3) and is molded on the collar via at least one set breaking point connection (7) at a distance from the base body (1) prior to fitting of the fastening element. A secure and reliable seal is achieved.

10 Claims, 1 Drawing Sheet

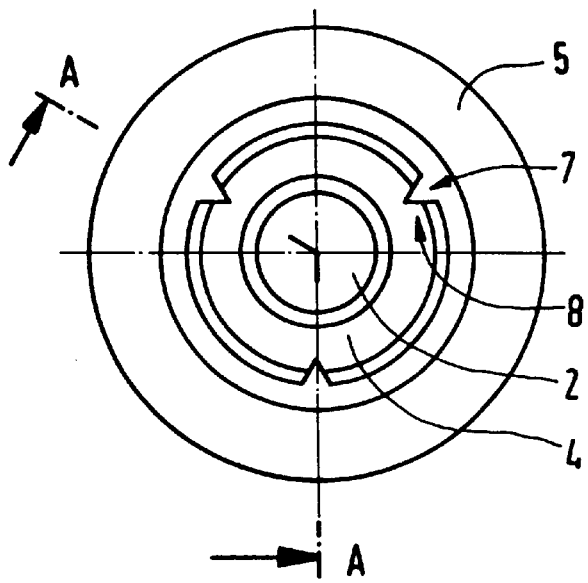
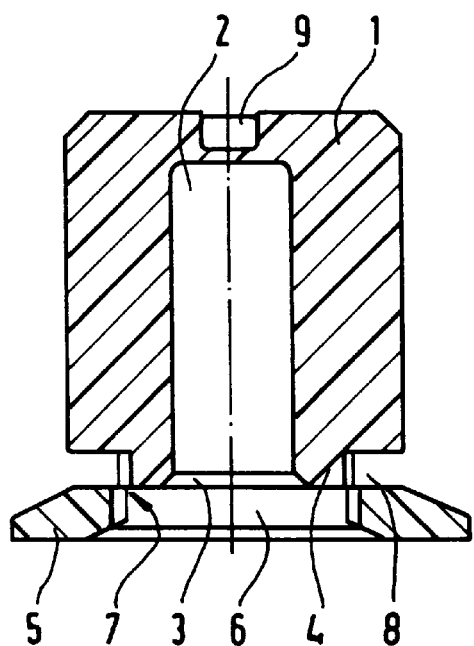
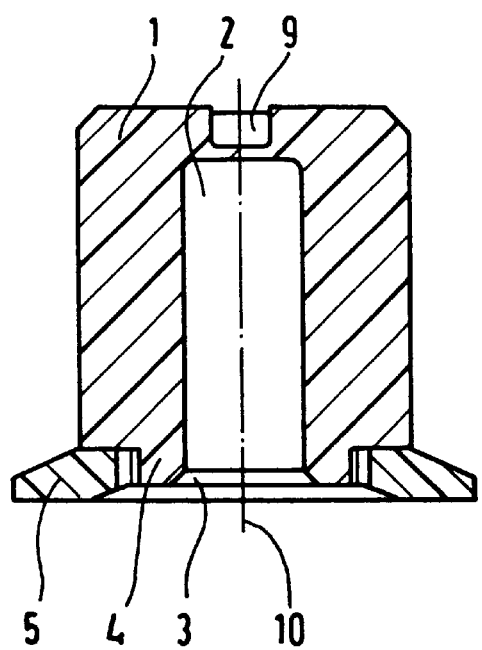

PLASTIC NUT WITH MOLDED WASHER

BACKGROUND OF THE INVENTION

The invention relates to a plastic fastening element for fitting on a stud.

Hole-free connections in which a stud forms the binding element between a base material and components to be fastened thereon are used in many branches of industrial manufacture. For example, it is known in the automotive industry to fix components, which may be, in particular, connecting strips, floor carpets or interior trims, on the body structure using this connection technology. For this purpose, a metal stud on which the fastening element can be fitted is welded on the body structure. The fastening elements always have to be adapted precisely to the respective requirements.

To increase the area of contact between component and fastening element and/or to seal the adjoining region round the stud from moisture which penetrates between component and base material, it is known to place a perforated disc suitable for the respective purpose beneath the fastening element, for example a nut. However, solutions of this type which comprise two components complicate the fitting operation.

Nuts designed with a flange represent a development. The flange can be straight or curved in design. A tight connection between the fastening element and a component can be created when fitting the nut on a stud. However, the sealing action of the flange is dependent only on the pressing force against the component produced by the fastening element.

SUMMARY OF THE INVENTION

The object of the present invention is to provide a generic fastening element which can be fitted simply and easily. A further object is to improve the sealing action. In addition, it should be possible to produce the fastening element inexpensively.

The plastic fastening element according to the invention for fitting onto a stud comprises a base body having a socket with at least one orifice for the stud; a collar which at least partially surrounds the orifice and is formed integrally with the base body; and a perforated disc which has a hole orientated substantially coaxially to the orifice and is molded on the collar via at least one set breaking point connection at a distance from the base body prior to fitting of the fastening element. In comparison with solutions known from the state of the art, in particular solutions with perforated discs arranged separately beneath the fastening element, manual as well as automatic fitting is advantageously simplified by molding a perforated disc on the collar of the base body.

According to the invention, the perforated disc is preferably displaceable along the collar until it rests on the base body after breakage of the set breaking point connection when it is fitted on a stud. Displacement starts as soon as the perforated disc comes to rest on a component which is to be fixed to a base member by hole-free connection technology (such as a welded stud) and a force applied longitudinally to the fastening element and leading to breakage of the set breaking points presses the base body of the fastening element further onto the stud so the perforated disc advantageously rests tightly on the component and on the base body, forming a seal.

To improve the sealing action, it is proposed that the perforated disc consists of a material which is different from, in particular softer than the plastics material of the fastening element.

According to an advantageous development of the fastening means, it is proposed that the perforated disc is an at least partially elastically deformable sealing disc.

The preferred refinements of the fastening element according to the invention produce a secure and reliable seal. Possible production tolerances of the fastening element, the stud and/or the component fixed by them do not affect the sealing action because an adequately large sealing area, or sealing bead, can be achieved owing to the deformability of the perforated disc.

To simplify production, it is proposed that the perforated disc is molded on the collar of the fastening element by injection of two components.

To simplify fitting of the fastening element, it is proposed that at least three set breaking point connections are formed between collar and perforated disc. The set breaking points are preferably formed, i.e. in particular injection molded, on the perforated disc with equal spacing from one another in each case, preferably at an angle of 120°.

A refinement of the fastening element is preferred in which the collar has grooves which cooperate with the set breaking points during the displacement of the perforated disc towards the base body.

The hole in the perforated disc preferably has at least the same diameter as the orifice of the socket.

To protect the stud thread, it is proposed that the socket of the fastening element is designed as a blind hole.

To simplify removal of the fastening element, as necessary, the blind hole according to the invention preferably has an internal thread and/or the base body a good fit, in particular a slot for a screw tool, for example a screw driver, and/or the surface of the perforated disc remote from the base body an increased coefficient of friction.

For further simplification of fitting and production of a fastening element it is proposed that it is rotationally symmetrical with respect to a longitudinal axis.

According to the invention, the fastening element is preferably, in particular, a plastic nut, the socket being so dimensioned that the fastening element can be struck onto a threaded metallic stud.

Further advantages and details of the invention will be described with reference to a preferred embodiment of a fastening element illustrated in the drawings.

BRIEF DESCRIPTION OF THE DRAWINGS

FIG. 1 is a side view of the fastening element prior to fitting, in a section along line A—A;

FIG. 2 shows the fastening element according to FIG. 1 after fitting;

FIG. 3 shows the fastening element according to FIGS. 1 and 2 in a view from below.

DETAILED DESCRIPTION OF THE INVENTION

FIG. 1 shows a fastening element, in particular a plastic nut, prior to fitting on a stud, not shown, in particular a threaded metallic stud, in a side view in section along line A—A. The fastening element has a base body 1 having a socket 2 preferably designed as a blind hole with at least one orifice 3 for the stud; a collar 4 which at least partially surrounds the orifice 3 and is formed integrally with the base body 1; and a perforated disc 5 which has a hole 6 orientated substantially coaxially to the orifice 3 and is molded, preferably by injection of two components, on the collar 4 via at least one set breaking point connection 7 at a distance from the base body 1 prior to fitting of the fastening element.

During the fitting operation, the perforated disc 5 can be displaced on a stud along the collar 4 until it rests on the base body 1 after breakage of the set breaking point 7. Displacement commences as soon as the perforated disc 5 comes to rest on a component, not shown, and a force applied longitudinally to the fastening element and leading to breakage of the set breaking points 7 presses the base body 1 of the fastening element further onto the stud so the perforated disc 5 rests tightly on the component and on the base body 1, as shown in FIG. 2, while forming a seal.

The perforated disc 5 preferably consists of a material which is different from, in particular softer than the plastics material of the fastening element. According to an advantageous development, the perforated disc 5 is an at least partially elastically deformable sealing disc.

FIG. 3 shows the fastening element according to FIG. 1 and 2 in a view from below. It can be seen how at least three set breaking points 7 are preferably formed between collar 4 and perforated disc 5, the set breaking points 7 preferably each being formed, in particular injected, on the perforated disc 5 with equal spacing from one another, preferably at an angle of 120°. The collar 4 has grooves 8 which preferably cooperate with the set breaking points 7 during displacement of the perforated disc 5 toward the base body 1.

The hole 6 in the perforated disc 5 has at least the same diameter as the orifice 3 of the socket 2. It can be seen from the figures, for example from FIG. 1, that the hole 6 in the perforated disc 5 is somewhat greater according to the embodiment than the external diameter of the collar 4 surrounding the orifice 3 of the aperture 2.

To simplify removal of the fastening element, as necessary, the blind hole according to the invention preferably has an internal thread, not shown, and/or the base body 1 has a slot 9 for a screwdriver, and/or the surface of the perforated disc 5 remote from the base body 1 may be provided with an increased coefficient of friction.

The fastening element according to the embodiment is rotationally symmetrical with respect to its longitudinal axis 10.

In comparison with solutions known from the state of the art, in particular solutions with perforated discs arranged separately beneath the fastening element, manual as well as automatic fitting is advantageously simplified by shaping a perforated disc 5 on the collar 4 of the base body 1. A secure and reliable seal is also achieved with the preferred refinements of the fastening element according to the invention. Furthermore, possible production tolerances of the fastening element, the stud and/or the component fixed thereto do not affect the sealing action as an adequately large sealing area or sealing bead can be achieved owing to the deformability of the perforated disc.

What is claimed is:

1. A plastic fastening element for fitting on a stud, said element comprising:

a base body (1) having a socket (2) with at least one orifice (3) for the stud;

a collar (4) which at least partially surrounds the orifice (3) and is formed integrally with the base body (1); and a perforated disc (5) which has a hole (6) orientated substantially coaxially to the orifice (3) and is molded on the collar (4) via at least one set breaking point (7) at a distance from the base body (1) prior to fitting of the fastening element, said disc being connected to the body via said at least one set breaking point connection (7), said perforated disc (5) comprising an elastically deformable sealing disc.

2. A fastening element according to claim 1, characterized in that the perforated disc (5) is movable along the collar (4) until it rests against the base body (1) after breakage of the breaking point connection (7).

3. A fastening element according to claim 1, characterized in that the fastening element includes a structure engageable by a tool for removal of the fastening element from a stud.

4. A fastening element according to claim 1, characterized in that the hole (6) in the perforated disc (5) has a greater diameter than the orifice (3) of the socket (2).

5. A fastening element according to claim 4, characterized in that the socket (2) is designed as a blind hole.

6. A fastening element according to claim 5, characterized in that the blind hole has an internal thread.

7. A plastic fastening element for fitting on a stud, said element comprising:

a base body (1) having a socket (2) with at least one orifice (3) for the stud;

a collar (4) which at least partially surrounds the orifice (3) and is formed integrally with the base body (1); and a perforated disc (5) which has a hole (6) orientated substantially coaxially to the orifice (3) and is molded on the collar (4) via at least one set breaking point (7) at a distance from the base body (1) prior to fitting of the fastening element, said disc being connected to the body via at least three set breaking point connections (7) formed between said collar (4) and said perforated disc (5).

8. A fastening element according to claim 7, characterized in that the set breaking point connections (7) are each formed on the perforated disc (5) with equal spacing from one another, preferably at an angle of 120°.

9. A fastening element according to claim 7, characterized in that the collar (4) has grooves (8) cooperating with the set breaking point connections (7).

10. A plastic fastening element for fitting on a stud, said element comprising:

a base body (1) having a socket (2) with at least one orifice (3) for the stud;

a collar (4) which at least partially surrounds the orifice (3) and is formed integrally with the base body (1); and a perforated disc (5) which has a hole (6) orientated substantially coaxially to the orifice (3) and is molded on the collar (4) via at least one set breaking point (7) at a distance from the base body (1) prior to fitting of the fastening element, said disc being connected to the body via at least one set breaking point connection (7), said perforated disc (5) consisting of a material which is softer than the material of the fastening element.

* * * * *